US012633551B2

(12) United States Patent
An et al.

(10) Patent No.: US 12,633,551 B2
(45) Date of Patent:      May 19, 2026

(54) CARTRIDGE FOR FUEL CELL HUMIDIFIER, AND FUEL CELL HUMIDIFIER

(71) Applicant: KOLON INDUSTRIES, INC., Seoul (KR)

(72) Inventors: Na Hyeon An, Seoul (KR); Do Woo Kim, Seoul (KR); Jung Kun Her, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 281 days.

(21) Appl. No.: 18/551,609

(22) PCT Filed: Apr. 25, 2022

(86) PCT No.: PCT/KR2022/005844
§ 371 (c)(1),
(2) Date: Sep. 21, 2023

(87) PCT Pub. No.: WO2022/245001
PCT Pub. Date: Nov. 24, 2022

(65) Prior Publication Data
US 2024/0304839 A1      Sep. 12, 2024

(30) Foreign Application Priority Data

May 17, 2021    (KR) ........................ 10-2021-0063409
Jun. 1, 2021    (KR) ........................ 10-2021-0070522

(51) Int. Cl.
*H01M 8/04*        (2016.01)
*H01M 8/04119*     (2016.01)
*H01M 8/10*        (2016.01)

(52) U.S. Cl.
CPC ... *H01M 8/04149* (2013.01); *H01M 8/04141* (2013.01); *H01M 2008/1095* (2013.01)

(58) Field of Classification Search
CPC ..................... H01M 8/04141; H01M 8/04149
See application file for complete search history.

(56) References Cited

U.S. PATENT DOCUMENTS 9,209,467 B2 * 12/2015 Kim ................. H01M 8/04141
2007/0007674 A1    1/2007 Hasegawa
(Continued)

FOREIGN PATENT DOCUMENTS

EP         3804842 A1     4/2021
JP     2007324031 A  * 12/2007
(Continued)

OTHER PUBLICATIONS

The office action dated Oct. 8, 2024 related to the corresponding Korean Patent application (Application No. 10-2021-0070522).
(Continued)

*Primary Examiner* — Robert A Hopkins
(74) *Attorney, Agent, or Firm* — Harvest IP Law, LLP

(57) ABSTRACT

The present invention relates to: a cartridge for a fuel cell humidifier for humidifying dry gas supplied from the outside by using wet gas discharged from a fuel cell stack; and a fuel cell humidifier, the cartridge comprising: an inner case having an opening at the end thereof, and having a plurality of hollow fiber membranes contained therein; and a first gas inlet and a first gas outlet formed to be spaced from each other in a first axial direction in the inner case, wherein: the inner case comprises a first segment having the hollow fiber membranes contained therein, a second segment spaced from the first segment on the basis of a second axial direction that is vertical with respect to the first axial direction, and a third segment positioned between the first segment and the second segment on the basis of the second axial direction; and the average thickness of the third segment is thinner than each of the average thickness of the
(Continued)

first segment and the average thickness of the second segment.

18 Claims, 10 Drawing Sheets

(56)                      References Cited

U.S. PATENT DOCUMENTS

2013/0065140  A1      3/2013  Kim
2016/0036075  A1      2/2016  Kim

FOREIGN PATENT DOCUMENTS

JP           2010151339  A       7/2010
JP           2015226859  A      12/2015
KR         20130029306  A       3/2013
KR         20140010774  A       1/2014
KR         20150078533  A       7/2015
KR         20190121474  A      10/2019
KR         20200122211  A      10/2020
KR         20200122260  A      10/2020
KR           102248995  B1      5/2021

OTHER PUBLICATIONS

The office action dated Oct. 08, 2024r elated to the corresponding Korean Patent application (Application No. 10-2021-0063409).
European Search Report dated Nov. 12, 2024.

* cited by examiner

CARTRIDGE FOR FUEL CELL HUMIDIFIER, AND FUEL CELL HUMIDIFIER

CROSS REFERENCE TO RELATED APPLICATION(S)

This application is a National Stage of International Application No. PCT/KR2022/005844 filed on Apr. 25, 2022, claiming priority based on Korean Patent Application No. 10-2021-0063409 filed on May 17, 2021 and Korean Patent Application No. 10-2021-0070522 filed on Jun. 1, 2021, the disclosures of which are incorporated herein by reference in their entireties.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 120 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111a and an off-gas outlet 111b and a plurality of hollow fiber membranes 112 in the mid-case 111. Opposite ends of a bundle of hollow fiber membranes 112 are potted in fixing layers 113. In general, each of the fixing layers 113 is formed by hardening a liquid polymer, such as liquid polyurethane resin, using a casting method. The fixing layers 113, in which ends of the hollow fiber membranes 112 are potted, and resin layers 114 provided between the fixing layers 113 and the mid-case 111 isolate the inner spaces of the caps 120 from the inner space of the mid-case 111. Similarly to the fixing layers 113, each of the resin layers 114 is generally formed by hardening a liquid polymer, such as liquid polyurethane resin, using a casting method.

Air supplied from the outside flows along hollows of the hollow fiber membranes 112. Off-gas introduced into the mid-case 111 through the off-gas inlet 111a comes into contact with outer surfaces of the hollow fiber membranes 112, and is discharged from the mid-case 111 through the off-gas outlet 111b. When the off-gas comes into contact with the outer surfaces of the hollow fiber membranes 112, moisture contained in the off-gas is transmitted through the hollow fiber membranes 112 to humidify air flowing along the hollows of the hollow fiber membranes 112.

Conventionally, humidification is intensively carried out through relatively outer ones of the hollow fiber membranes 112, whereas humidification is not smoothly carried out through relatively inner ones of the hollow fiber membranes 112, resulting in low overall humidification performance.

DISCLOSURE

Technical Problem

The present disclosure has been made in view of the above problems, and it is an object of the present disclosure to provide a cartridge of a humidifier for fuel cells and a humidifier for fuel cells capable of improving humidification performance using hollow fiber membranes.

Technical Solution

In order to accomplish the above object, the present disclosure may include the following constructions.

A humidifier for fuel cells according to the present disclosure may include a humidifying module configured to humidify dry gas supplied from the outside using wet gas discharged from a fuel cell stack, a first cap coupled to one end of the humidifying module, and a second cap coupled to the other end of the humidifying module. The humidifying module may include a mid-case open at opposite ends thereof and at least one cartridge disposed in the mid-case, the cartridge including a plurality of hollow fiber membranes. The cartridge may include an inner case open at opposite ends thereof, the hollow fiber membranes being received in the inner case, and a first gas inlet and a first gas outlet formed at the inner case so as to be spaced apart from each other in a first axis direction. The inner case may include a first segment in which the hollow fiber membranes are received, a second segment spaced apart from the first segment in a second axis direction perpendicular to the first axis direction, and a third segment located between the first segment and the second segment in the second axis direction. The average thickness of the third segment may be less than each of the average thickness of the first segment and the average thickness of the second segment.

A cartridge of a humidifier for fuel cells according to the present disclosure may be a cartridge of a humidifier for fuel cells configured to humidify dry gas supplied from the outside using wet gas discharged from a fuel cell stack, the cartridge including an inner case having openings formed in ends thereof, a plurality of hollow fiber membranes being received in the inner case, and a first gas inlet and a first gas outlet formed at the inner case so as to be spaced apart from each other in a first axis direction. The inner case may include a first segment in which the hollow fiber membranes are received, a second segment spaced apart from the first segment in a second axis direction perpendicular to the first axis direction, and a third segment located between the first segment and the second segment in the second axis direction. The average thickness of the third segment may be less than each of the average thickness of the first segment and the average thickness of the second segment.

Advantageous Effects

The present disclosure may be implemented such that humidification is smoothly achieved with respect to the entirety of hollow fiber membranes. In the present disclosure, therefore, it is possible to increase the proportion of the hollow fiber membranes used for humidification, whereby it is possible to increase overall humidification performance.

BEST MODE

Hereinafter, an embodiment of a humidifier for fuel cells according to the present disclosure will be described in detail with reference to the accompanying drawings. A cartridge of a humidifier for fuel cells according to the present disclosure may be included in a humidifier for fuel cells according to the present disclosure, and therefore the cartridge of the humidifier for fuel cells according to the present disclosure will also be described while the humidifier for fuel cells according to the present disclosure is described. Meanwhile, in FIGS. 6, 10, 13, and 14, two parallel curved lines are omission lines.

Figure 1:
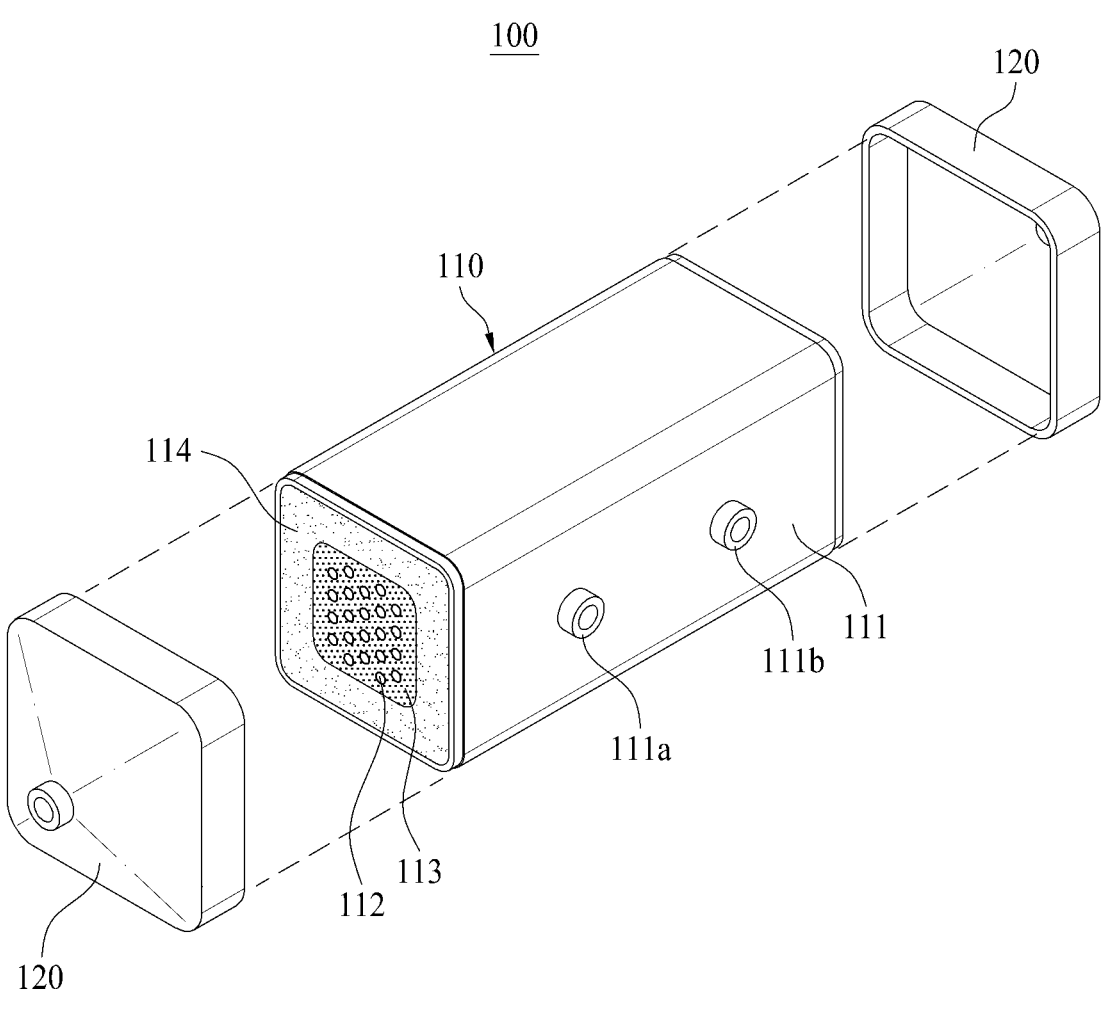
FIG. 1 is a schematic exploded perspective view of a conventional humidifier for fuel cells.
Figure 2:
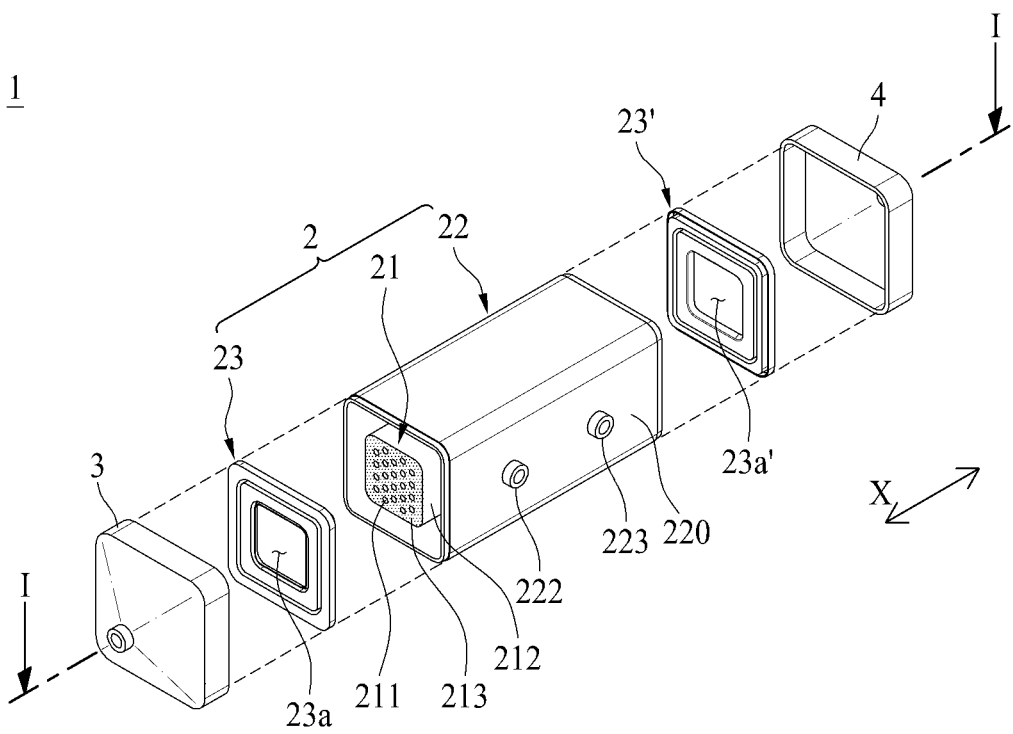
FIG. 2 is a schematic exploded perspective view of a humidifier for fuel cells according to the present disclosure.
Figure 3:
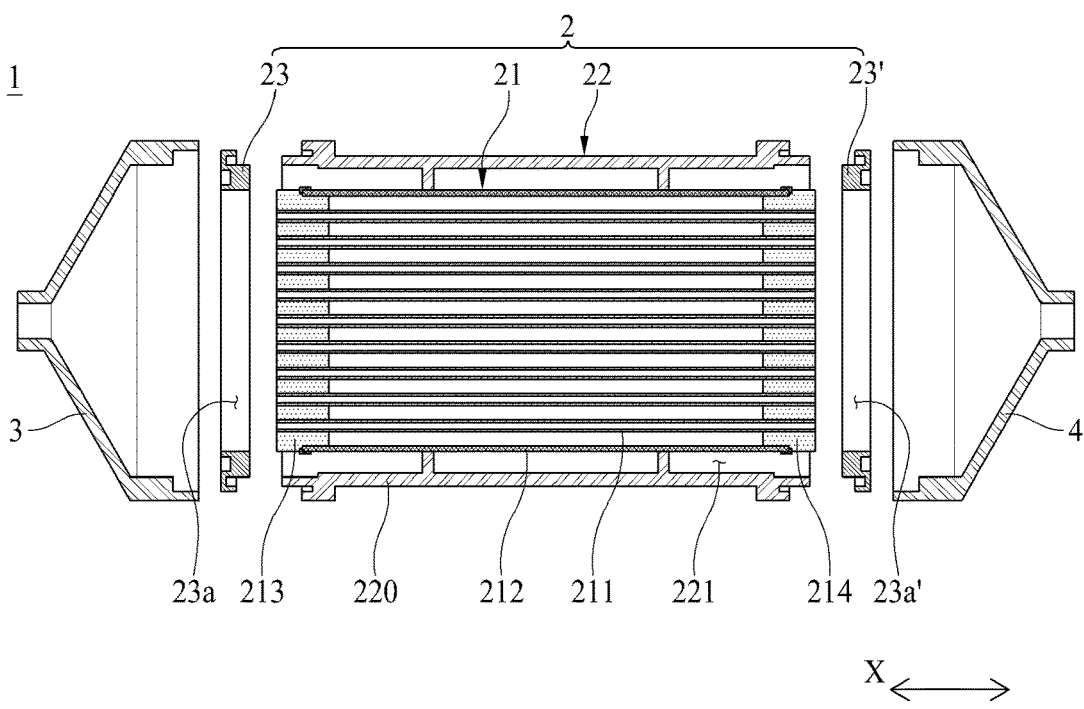
FIG. 3 is a schematic exploded sectional view showing the humidifier for fuel cells according to the present disclosure, taken along line I-I of FIG. 2.
Figure 4:
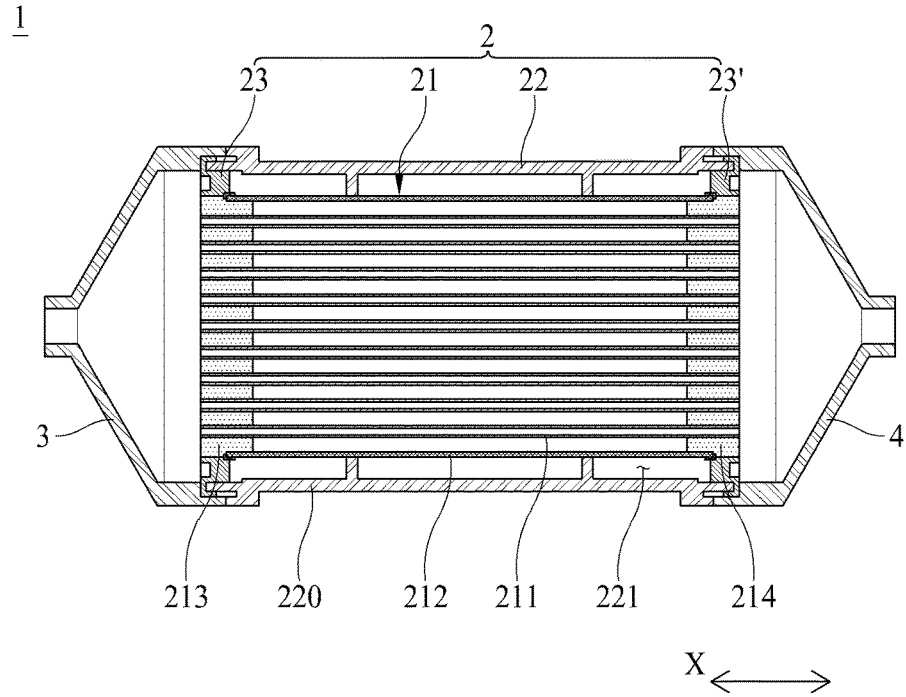
FIG. 4 is a schematic coupled sectional view showing the humidifier for fuel cells according to the present disclosure, taken along line I-I of FIG. 2.
Figure 5:
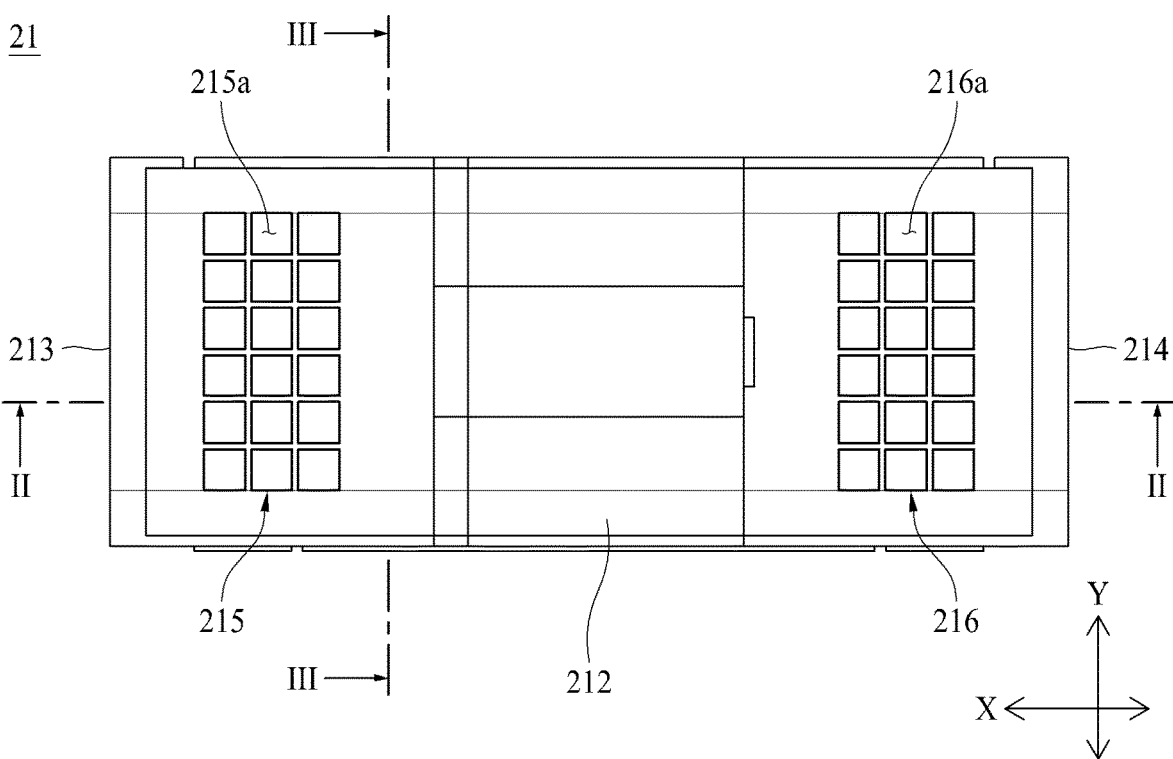
FIG. 5 is a schematic plan view of a cartridge of the humidifier for fuel cells according to the present disclosure.
Figure 6:
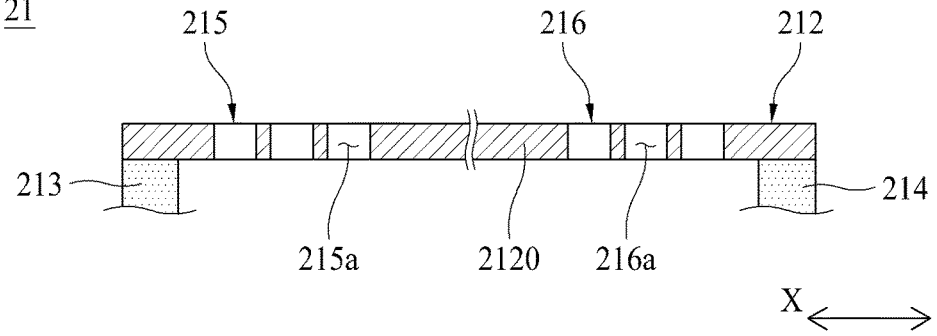
FIG. 6 is a schematic side sectional view showing the cartridge of the humidifier for fuel cells according to the present disclosure, taken along line II-II of FIG. 5.

Referring to FIGS. 2 to 4, a humidifier 1 for fuel cells according to the present disclosure is configured to humidify dry gas supplied from the outside using wet gas discharged from a fuel cell stack (not shown). The dry gas may be fuel gas or air. The dry gas may be humidified by the wet gas, and may be supplied to the fuel cell stack. The humidifier 1 for fuel cells according to the present disclosure includes a humidifying module 2 configured to humidify dry gas, a first cap 3 coupled to one end of the humidifying module 2, and a second cap 4 coupled to the other end of the humidifying module 2.

Referring to FIGS. 2 to 6, the humidifying module 2 humidifies dry gas supplied from the outside. The first cap 3 may be coupled to one end of the humidifying module 2. The second cap 4 may be coupled to the other end of the humidifying module 2. The first cap 3 may transmit dry gas to the humidifying module 2. In this case, the second cap 4 may transmit dry gas humidified by wet gas in the humidifying module 2 to the outside. The first cap 3 may transmit wet gas to the humidifying module 2. In this case, the second cap 4 may discharge wet gas to the outside after dry gas is humidified in the humidifying module 2.

The humidifying module 2 includes at least one cartridge 21 and a mid-case 22.

The cartridge 21 is disposed in the mid-case 22, and includes a plurality of hollow fiber membranes 211. The hollow fiber membranes 211 may be coupled to the cartridge 21 so as to be modularized. Consequently, the hollow fiber membranes 211 may be installed in the mid-case 22 through a process of coupling the cartridge 21 to the mid-case 22. In the humidifier 1 for fuel cells according to the present disclosure, therefore, ease in installation, separation, and replacement of the hollow fiber membranes 211 may be improved.

The cartridge 21 may include an inner case 212.

The inner case 212 has openings formed in ends thereof, and the plurality of hollow fiber membranes 211 is received in the inner case. The hollow fiber membranes 211 may be disposed in the inner case 212 so as to be modularized. The hollow fiber membranes 211 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 21 may include fixing layers 213 and 214.

Ends of the plurality of hollow fiber membranes 211 are potted in the fixing layers 213 and 214, which close the openings of the inner case 212. One side of each of the plurality of hollow fiber membranes 211 may be fixed by the fixing layer 213, and the other side of each of the plurality of hollow fiber membranes 211 may be fixed by the fixing layer 214. Each of the fixing layers 213 and 214 may be formed by hardening a liquid resin, such as liquid polyurethane resin, through a casting process. The fixing layers 213 and 214 may fix the ends of the plurality of hollow fiber membranes 211 to the inner case 212.

The fixing layers 213 and 214 may be formed so as not to block hollows of the plurality of hollow fiber membranes 211. Consequently, dry gas or wet gas supplied from the outside may be supplied to the hollows of the hollow fiber membranes 211 without being disturbed by the fixing layers 213 and 214, and may be discharged from the hollows of the hollow fiber membranes 211 without being disturbed by the fixing layers 213 and 214.

The cartridge 21 may include a first gas inlet 215 and a first gas outlet 216.

The first gas inlet 215 is formed in the inner case 212. The first gas inlet 215 may be formed at one side 2120 of the inner case 212. Based on FIG. 6, one side 2120 of the inner case 212 may correspond to an upper surface. The first gas inlet 215 may allow wet gas or dry gas to be introduced into the inner case 212 therethrough. The first gas inlet 215 may be formed through the inner case 212. The first gas inlet 215 may be implemented by a plurality of through-holes formed through the inner case 212. In this case, the first gas inlet 215 may include a plurality of inflow windows 215a formed through different parts of the inner case 212. The inflow windows 215a may be disposed spaced apart from each other in a first axis direction (X-axis direction) and a second axis direction (Y-axis direction) so as to form a matrix. The first axis direction and the second axis direction (Y-axis direction) are axis directions perpendicular to each other.

Although not shown, the first gas inlet 215 may be implemented by a single through-hole formed through the inner case 212.

The first gas outlet 216 is formed in the inner case 212. The first gas outlet 216 may be formed at one side 2120 of the inner case 212. The first gas outlet 216 may allow wet gas or dry gas to be discharged from the inner case 212 therethrough. The first gas outlet 216 may be formed through the inner case 212. The first gas outlet 216 may be implemented by a plurality of through-holes formed through the inner case 212. In this case, the first gas outlet 216 may include a plurality of outflow windows 216a formed through different parts of the inner case 212. The outflow windows 216a may be disposed spaced apart from each other in the first axis direction (X-axis direction) and the second axis direction (Y-axis direction) so as to form a matrix. Although not shown, the first gas outlet 216 may be implemented by a single through-hole formed through the inner case 212.

The first gas outlet 216 and the first gas inlet 215 may be disposed spaced apart from each other in the first axis direction (X-axis direction). Consequently, wet gas may be supplied into the mid-case 22, may be supplied into the inner case 212 through the first gas inlet 215, may come into contact with outer surfaces of the hollow fiber membranes 211, may humidify dry gas flowing along the hollows of the hollow fiber membranes 211, may be discharged from the inner case 212 through the first gas outlet 216, and may be discharged from the mid-case 22. Meanwhile, dry gas may be supplied into the mid-case 22, may be supplied into the inner case 212 through the first gas inlet 215, may come into contact with the outer surfaces of the hollow fiber membranes 211, may be humidified by wet gas flowing along the hollows of the hollow fiber membranes 211, may be discharged from the inner case 212 through the first gas outlet 216, and may be discharged from the mid-case 22.

The cartridge 21 is coupled to the mid-case 22. The cartridge 21 may be disposed in the mid-case 22. Opposite ends of the mid-case 22 are open. In this case, a receiving hole 221 may be formed in the mid-case 22. The receiving hole 221 may be formed so as to extend through the mid-case 22 in the first axis direction (X-axis direction).

A second gas inlet 222 and a second gas outlet 223 may be formed in the mid-case 22. The second gas inlet 222 may allow wet gas or dry gas to be introduced into the mid-case 22 therethrough. The second gas outlet 223 may allow wet gas or dry gas to be discharged from the mid-case 22 therethrough. The second gas inlet 222 and the second gas outlet 223 may be disposed spaced apart from each other in the first axis direction (X-axis direction).

When wet gas flows through the second gas inlet 222 and the second gas outlet 223, the wet gas and dry gas may flow as follows.

After being supplied into the mid-case 22 through the second gas inlet 222, wet gas may be supplied into the cartridge 21 through the first gas inlet 215, and may come into contact with the outer surfaces of the hollow fiber membranes 211. During this process, moisture contained in the wet gas may be transmitted through the hollow fiber membranes 211 to humidify dry gas flowing along the hollows of the hollow fiber membranes 211. The humidified dry gas may be discharged from the hollow fiber membranes 211, may be discharged through the second cap 4, and may be supplied to the fuel cell stack. After humidifying the dry gas, the wet gas may be discharged from the cartridge 21 through the first gas outlet 216, may flow through the interior of the mid-case 22, and may be discharged from the mid-case 22 through the second gas outlet 223. The second gas inlet 222 may be connected to the fuel cell stack such that the wet gas is supplied thereto. In this case, the wet gas may be off-gas discharged from the fuel cell stack.

When dry gas flows through the second gas inlet 222 and the second gas outlet 223, the dry gas and wet gas may flow as follows.

After being supplied into the mid-case 22 through the second gas inlet 222, dry gas may be supplied into the cartridge 21 through the first gas inlet 215, and may come into contact with the outer surfaces of the hollow fiber membranes 211. During this process, moisture contained in wet gas flowing along the hollows of the hollow fiber membranes 211 may be transmitted through the hollow fiber membranes 211 to humidify the dry gas. The humidified dry gas may be discharged from the cartridge 21 through the first gas outlet 216, may flow through the interior of the mid-case 22, may be discharged from the mid-case 22 through the second gas outlet 223, and may be supplied to the fuel cell stack. After humidifying the dry gas, the wet gas may be discharged from the hollow fiber membranes 211, and may be discharged to the outside through the second cap 4. The first cap 3 may be connected to the fuel cell stack such that the wet gas is supplied thereto. In this case, the wet gas may be off-gas discharged from the fuel cell stack.

The second gas inlet 222 and the second gas outlet 223 may protrude from a mid body 220. The mid body 220 forms the overall appearance of the mid-case 22. The second gas inlet 222 and the second gas outlet 223 may protrude from the mid body 220 in the same direction. Alternatively, the second gas inlet 222 and the second gas outlet 223 may protrude from the mid body 220 in different directions. The second gas inlet 222, the second gas outlet 223, and the mid body 220 may be integrally formed.

The humidifying module 2 may include a plurality of packing members 23 and 23'.

The packing members 23 and 23' form a hermetic seal between the cartridge 21 and the mid-case 22 in order to prevent direct mixing between dry gas and wet gas. The packing members 23 and 23' may be inserted between the cartridge 21 and the mid-case 22. In this case, the cartridge 21 may be inserted through first through-holes 23a and 23a' formed respectively in the packing members 23 and 23'. The packing members 23 and 23' may be disposed respectively at opposite sides of the cartridge 21. Although not shown, resin layers may be formed respectively at the opposite sides of the cartridge 21 instead of the packing members 23 and 23'. Each of the resin layers may be formed by hardening a liquid polymer, such as liquid polyurethane resin, using a casting method.

Referring to FIGS. 2 to 4, the first cap 3 is coupled to one end of the humidifying module 2. A space between the first cap 3 and the cartridge 21 may be isolated from a space between the cartridge 21 and the mid-case 22 in a hermetically sealed state by the packing member 23 or the resin layer.

Referring to FIGS. 2 to 4, the second cap 4 is coupled to the other end of the humidifying module 2. The second cap 4 may be coupled to the other end of the humidifying module 2 so as to be spaced apart from the first cap 3 in the first axis direction (X-axis direction). A space between the second cap 4 and the cartridge 21 may be isolated from the space between the cartridge 21 and the mid-case 22 in a hermetically sealed state by the packing member 23' or the resin layer.

Referring to FIGS. 2 to 8, the cartridge 21 may be implemented as follows in order to improve humidification performance of the humidifier 1 for fuel cells according to the present disclosure.

The cartridge 21 may be formed so as to have a non-uniform thickness in the second axis direction (Y-axis direction). In this case, the inner case 212 may include a first segment 2121, a second segment 2122, and a third segment 2123.

The hollow fiber membranes 211 are received in each of the first segment 2121, the second segment 2122, and the third segment 2123. The first segment 2121, the second segment 2122, and the third segment 2123 may be disposed side by side in the second axis direction (Y-axis direction). In this case, the third segment 2123 may be disposed between the first segment 2121 and the second segment 2122 in the second axis direction (Y-axis direction). The first segment 2121 and the second segment 2122 may be spaced apart from each other in the state in which the third segment 2123 is interposed therebetween.

The average thickness of the third segment 2123 may be implemented so as to be less than each of the average thickness of the first segment 2121 and the average thickness of the second segment 2122. In this case, the average thickness is the mean of the thickness of each of the third segment 2123, the second segment 2122, and the first segment 2121 in the second axis direction (Y-axis direction). When the first axis direction (X-axis direction) is defined as a longitudinal direction of the inner case 212 and the second axis direction (Y-axis direction) is defined as a widthwise direction of the inner case 212, the thickness is a length in a third axis direction (Z-axis direction) perpendicular to each of the first axis direction (X-axis direction) and the second axis direction (Y-axis direction). When the thickness of each of the third segment 2123, the second segment 2122, and the first segment 2121 varies in the second axis direction (Y-axis direction), each of the third segment 2123, the second segment 2122, and the first segment 2121 may include a portion having a thickness equal to the average thickness, a portion having a thickness greater than the average thickness, and a portion having a thickness less than the average thickness. When the thickness of each of the third segment 2123, the second segment 2122, and the first segment 2121 is uniform without change in the second axis direction (Y-axis direction), each of the third segment 2123, the second segment 2122, and the first segment 2121 may include only a portion having a thickness equal to the average thickness.

As the average thickness of the third segment 2123 is implemented so as to be less than each of the average thickness of the first segment 2121 and the average thickness of the second segment 2122, humidification is smoothly achieved with respect to the entirety of the hollow fiber membranes 211, whereby it is possible to improve humidification performance of the humidifier 1 for fuel cells according to the present disclosure, which will hereinafter be described in detail.

Figure 8:
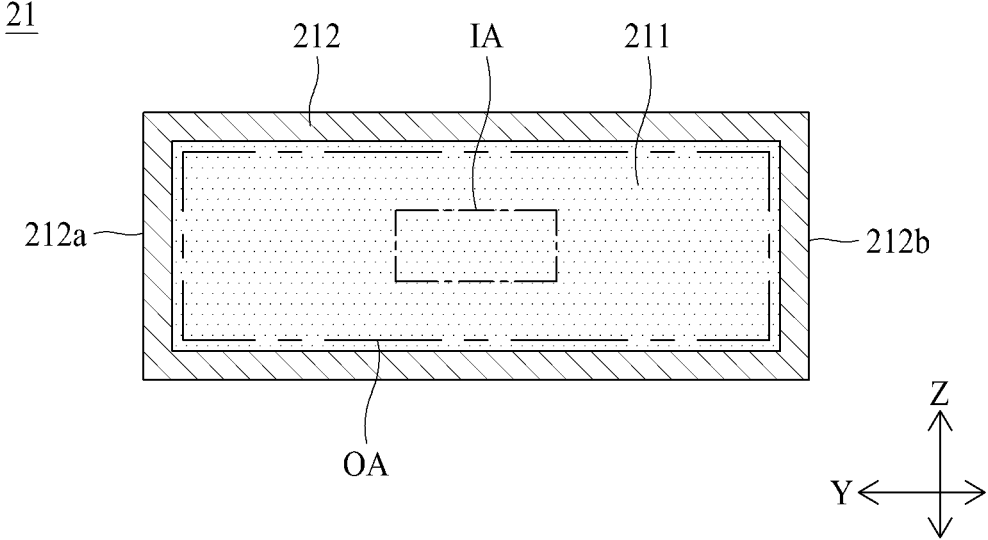
FIG. 8 is a schematic side sectional view showing a cartridge according to a comparative example, taken along line III-III of FIG. 5.

First, in a comparative example in which the inner case 212 is implemented so as to be overall uniform without a change in thickness in the second axis direction (Y-axis direction), as shown in FIG. 8, humidification is less smoothly achieved with respect to the hollow fiber membranes 211 located in an inner area IA than with respect to the hollow fiber membranes 211 located in an outer area OA. The reason for this is that it is difficult for wet gas or dry gas introduced into the inner case 212 to reach the hollow fiber membranes 211 located in the inner area IA through the hollow fiber membranes 211 located in the outer area OA. In the comparative example, therefore, the proportion of the hollow fiber membranes 211 used for humidification is low, resulting in low overall humidification performance. Meanwhile, the inner area IA, which is an area located inside the outer area OA, may be spaced apart from opposite ends 212a and 212b of the inner case 212 by the same distance in the second axis direction (Y-axis direction). The inner area IA may be spaced apart from an upper end and a lower end of the inner case 212 by the same distance in the third axis direction (Z-axis direction).

Figure 7:
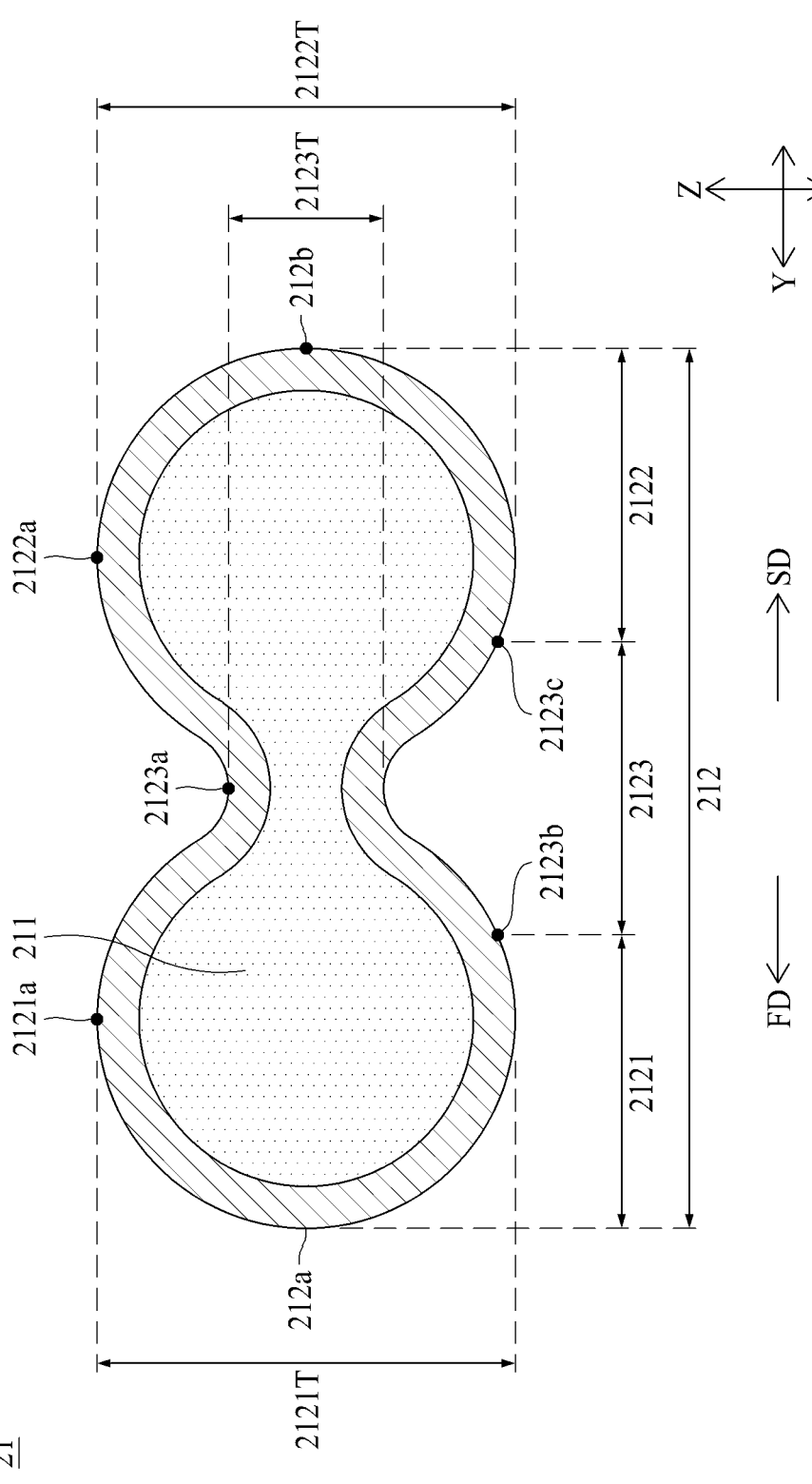
FIG. 7 is a schematic side sectional view showing the cartridge of the humidifier for fuel cells according to the present disclosure, taken along line III-III of FIG. 5.

Next, in an example in which the average thickness of the third segment 2123 is implemented so as to be less than each of the average thickness of the first segment 2121 and the average thickness of the second segment 2122, as shown in FIG. 7, the portion corresponding to the inner area IA of the comparative example (shown in FIG. 8) is implemented so as to have a smaller thickness. In the example, therefore, wet gas or dry gas may be smoothly transmitted even to the hollow fiber membranes 211 in the portion corresponding to the inner area IA of the comparative example (shown in FIG. 8), whereby humidification may be achieved. In the example, therefore, it is possible to reduce the proportion of the hollow fiber membranes 211 that are not used for humidification and at the same time to increase the proportion of the hollow fiber membranes 211 that are used for humidification, whereby it is possible to improve overall humidification performance, when compared to the comparative example.

Referring to FIGS. 2 to 7, the third segment 2123 may be formed such that a middle portion 2123a has a smaller thickness than opposite ends 2123b and 2123c in the second axis direction (Y-axis direction). The middle portion 2123a of the third segment 2123 is a part spaced apart from the opposite ends 2123b and 2123c of the third segment 2123 by the same distance in the second axis direction (Y-axis direction). In the humidifier 1 for fuel cells according to the present disclosure, therefore, the portion corresponding to the inner area IA of the comparative example (shown in FIG. 8), which is the most difficult to humidify, may be implemented so as to have a smaller thickness. In the humidifier 1 for fuel cells according to the present disclosure, therefore, it is possible to further increase the proportion of the hollow fiber membranes 211 that are used for humidification, whereby it is possible to further improve overall humidification performance.

The third segment 2123 may be formed so as to have a gradually increasing thickness from the middle portion 2123a to the opposite ends 2123b and 2123c. In this case, the third segment 2123 may have a gradually increasing thickness from the middle portion 2123a in a first direction (direction indicated by arrow FD), and may be connected to the first segment 2121 at one end 2123b. The third segment 2123 may have a gradually increasing thickness from the middle portion 2123a in a second direction (direction indicated by arrow SD), and may be connected to the second segment 2122 at the other end 2123b. The first direction (direction indicated by arrow FD) and the second direction (direction indicated by arrow SD) are parallel and opposite directions in the second axis direction (Y-axis direction). As a result, the third segment 2123 may be formed so as to have the minimum thickness 2123T at the middle portion 2123a. In the humidifier 1 for fuel cells according to the present disclosure, therefore, the portion corresponding to the inner area IA of the comparative example (shown in FIG. 8), which is the most difficult to humidify, may be implemented so as to have the smallest thickness, whereby it is possible to further increase the proportion of the hollow fiber membranes 211 that are used for humidification.

Here, the first segment 2121 may be formed such that the thickness is gradually changed from one end connected to the third segment 2123 to the other end. One end of the first segment 2121 is a part connected to one end 2123b of the third segment 2123. The other end of the first segment 2121 may correspond to one end 212a of the inner case 212. The first segment 2121 may be formed such that the thickness is gradually increased from one end to a point 2121a having the maximum thickness 2121T and is gradually decreased from the point 2121a having the maximum thickness 2121T to the other end. In this case, the first segment 2121 may be formed with an overall curved surface.

The second segment 2122 may be formed such that the thickness is gradually changed from one end connected to the third segment 2123 to the other end. One end of the second segment 2122 is a part connected to the other end 2123c of the third segment 2123. The other end of the second segment 2122 may correspond to the other end 212b of the inner case 212. The second segment 2122 may be formed such that the thickness is gradually increased from one end to a point 2122a having the maximum thickness 2122T and is gradually decreased from the point 2122a having the maximum thickness 2122T to the other end. In this case, the second segment 2122 may be formed with an overall curved surface.

The inner case 212 may be formed so as to be symmetrical with respect to a middle portion equidistantly spaced apart from the opposite ends 212a and 212b in the second axis direction (Y-axis direction) The middle portion of the inner case 212 and the middle portion 2123a of the third segment 2123 may be the same point. Consequently, the cartridge 21 may be implemented to have approximately equal humidification performance at opposite sides of the inner case 212 based on the middle portion thereof.

As shown in FIG. 7, the inner case 212 may be formed in the form of a curved surface having a thickness gradually increasing and then decreasing from the middle portion 2123a of the third segment 2123 in the first direction (direction indicated by arrow FD) and the second direction (direction indicated by arrow SD). For example, the inner case 212 may be formed in the form of a dumbbell. The third segment 2123, the second segment 2122, and the first segment 2121 may be integrally formed.

Figure 9:
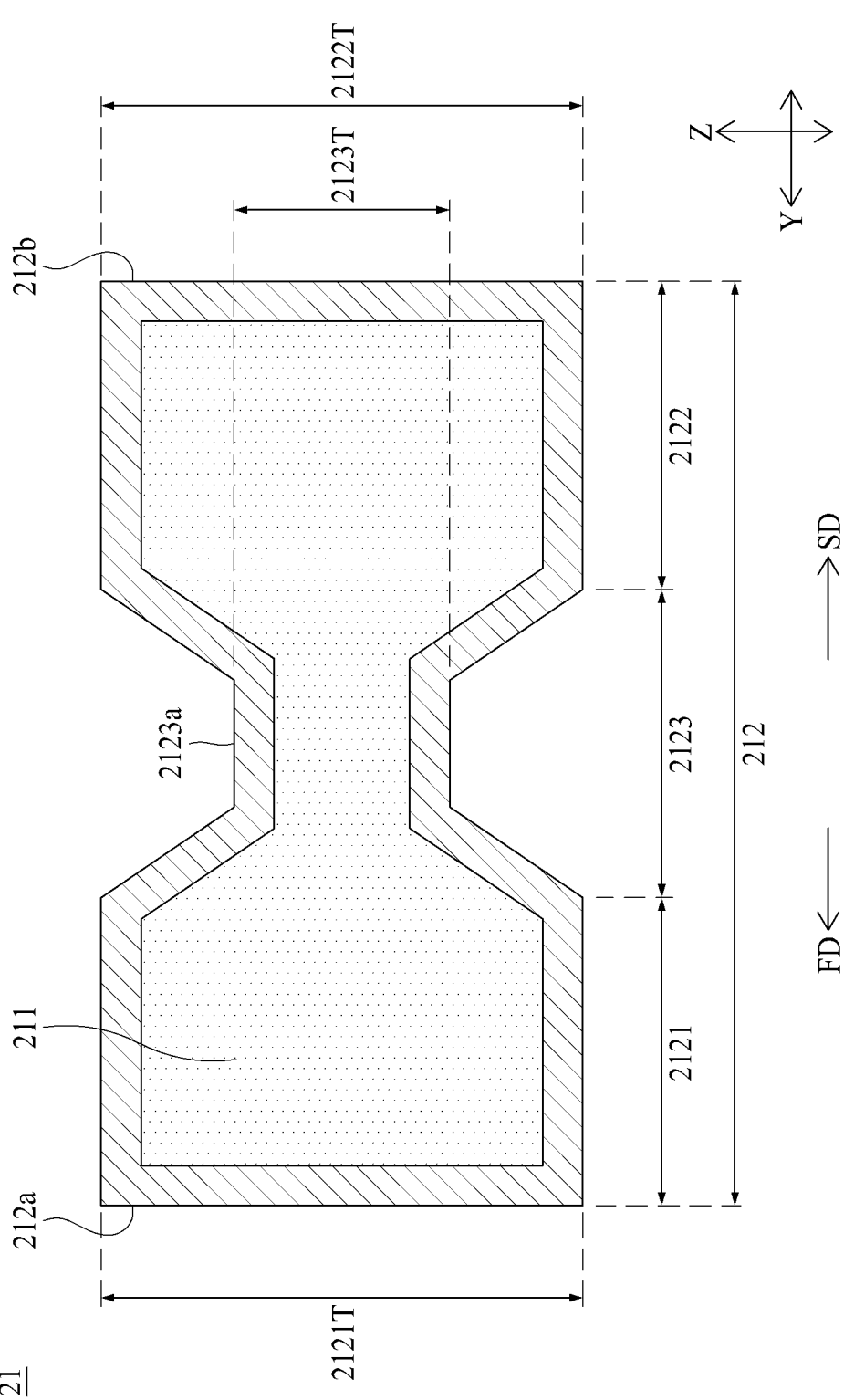
FIG. 9 is a schematic side sectional view showing a cartridge of a humidifier for fuel cells according to a modified embodiment of the present disclosure, taken along line III-III of FIG. 5.

As shown in FIG. 9, the inner case 212 may also be formed in the form of a combination of planes. In this case, the third segment 2123 may be formed in a sloped form such that the thickness is gradually increased after extending from the middle portion 2123a by predetermined length in the first direction (direction indicated by arrow FD) and the second direction (direction indicated by arrow SD) without a change in thickness. Each of the first segment 2121 and the second segment 2122 may be formed in the shape of a rectangular parallelepiped with no change in thickness. Although not shown, the inner case 212 may also be formed in the form of a combination of a curved surface and a flat surface.

Referring to FIGS. 2 to 9, the inner case 212 may be formed in a form that satisfies Equation 1 below.

$$0.2H < T < 0.5H \qquad \text{[Equation 1]}$$

In Equation 1 above, H may be the width of the inner case 212 in the second axis direction (Y-axis direction), and T may be defined as the maximum thickness of the inner case 212. Referring to FIGS. 7 and 9, H may correspond to the sum of the length of the first segment 2121, the length of the second segment 2122, and the length of the third segment 2123 in the second axis direction (Y-axis direction). T may correspond to the maximum thickness 2121T of the first segment 2121 or the maximum thickness 2122T of the second segment 2122 in the third axis direction (Z-axis direction).

As such, the inner case 212 satisfying Equation 1 above may be implemented such that the maximum thickness in the third axis direction (Z-axis direction) is more than 0.2 times and less than 0.5 times the widthwise length in the second axis direction (Y-axis direction). That is, the inner case 212 may be implemented so as to have a small thickness even based on the maximum thickness. Consequently, the cartridge 21 may be implemented so as to increase the proportion of the hollow fiber membranes 211 in contact with wet gas or dry gas introduced into the inner case 212, thereby contributing to improving overall humidification performance.

In this case, when the inner case 212 is implemented such that the maximum thickness in the third axis direction (Z-axis direction) is less than 0.2 times the widthwise length in the second axis direction (Y-axis direction), the capacity for the hollow fiber membranes 211 may be reduced, whereby humidification performance may be deteriorated. When the inner case 212 is implemented such that the maximum thickness in the third axis direction (Z-axis direction) is equal to or greater than 0.5 times the widthwise length in the second axis direction (Y-axis direction), it is difficult for wet gas or dry gas introduced into the inner case 212 to pass between relatively outer ones of the hollow fiber membranes 211 and to reach relatively inner ones of the hollow fiber membranes 211, whereby humidification performance may be deteriorated. In consideration thereof, the humidifier 1 for fuel cells according to the present disclosure has an inner case 212 implemented such that the maximum thickness in the third axis direction (Z-axis direction) is more than 0.2 times and less than 0.5 times the widthwise length in the second axis direction (Y-axis direction), whereby it is possible to improve humidification performance using the hollow fiber membranes 211.

Here, while wet gas or dry gas is introduced into the cartridge 21 and is discharged from the cartridge 21, the hollow fiber membranes 211 may be vibrated by the wet gas or the dry gas. The hollow fiber membranes 211 may directly collide with a structure located in the vicinity thereof due to such vibration, whereby the hollow fiber membranes 211 may be damaged or broken.

Figure 10:
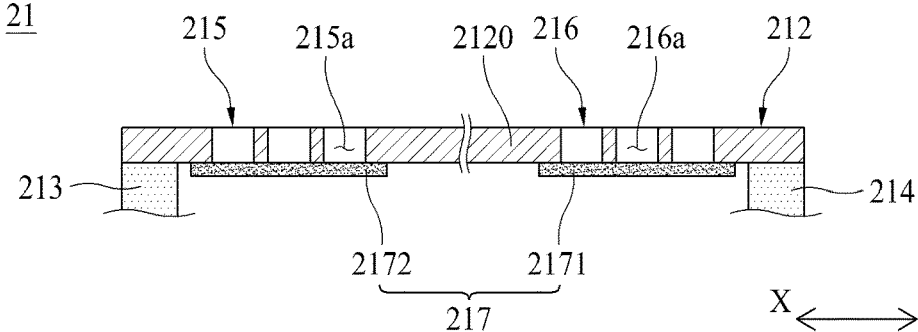
FIG. 10 is a schematic side sectional view showing the cartridge of the humidifier for fuel cells according to the present disclosure, taken along line II-II of FIG. 5.
Figure 11:
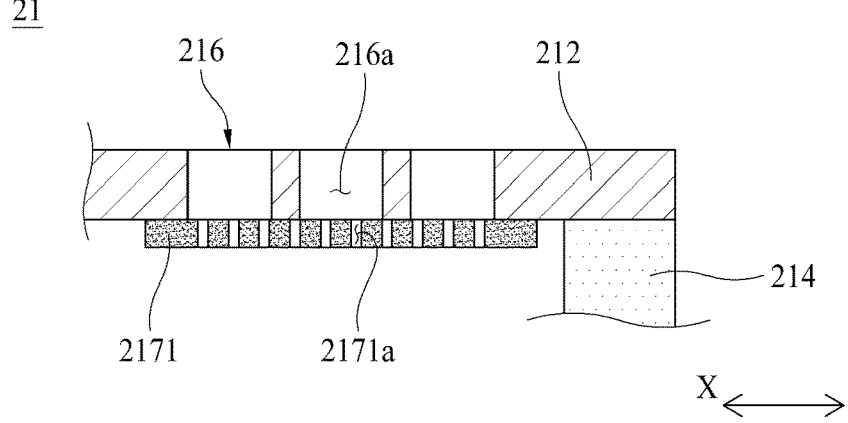
FIG. 11 is a schematic enlarged side sectional view of a first buffer member in the cartridge of the humidifier for fuel cells according to the present disclosure, taken along line II-II of FIG. 5.
Figure 12:
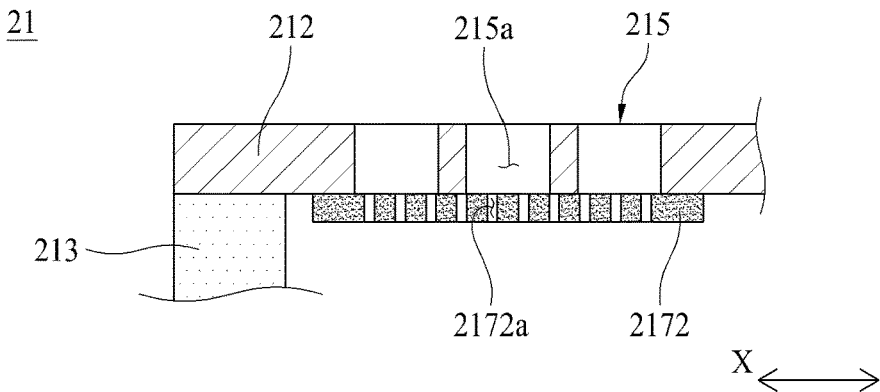
FIG. 12 is a schematic enlarged side sectional view of a second buffer member in the cartridge of the humidifier for fuel cells according to the present disclosure, taken along line II-II of FIG. 5.

In order to reduce damage to or breakage of the hollow fiber membranes 211, the cartridge 21 of the humidifier 1 for fuel cells according to the present disclosure may comprise a buffer member 217 (shown in FIG. 10).

Referring to FIGS. 2 to 6 and 10, the buffer member 217 may be coupled to the inner case 212 so as to be located in the inner case 212. The buffer member 217 may be coupled to the inner case 212 at at least one of the position between the first gas inlet 215 and the hollow fiber membranes 211 and the position between the first gas outlet 216 and the hollow fiber membranes 211. Even though the hollow fiber membranes 211 vibrate due to the flow of gas, therefore, the hollow fiber membranes 211 do not directly collide with the inner surface of the inner case 212 but collide with the buffer member 217. In the humidifier 1 for fuel cells according to the present disclosure, therefore, it is possible to mitigate the impact applied to the hollow fiber membranes 211, whereby it is possible to reduce the risk of damage to or breakage of the hollow fiber membranes 211. In the humidifier 1 for fuel cells according to the present disclosure, therefore, it is possible to extend the lifespan of the hollow fiber membranes 211, whereby it is possible to reduce maintenance cost. Meanwhile, vibration generated at the hollow fiber membranes 211 may be affected by the flow of gas, the pressure of gas when the gas flows, etc. In this case, gas that vibrates the hollow fiber membranes 211 may be wet gas or dry gas that flows through the first gas inlet 215 and the first gas outlet 216.

The buffer member 217 may be manufactured using a breathable material configured to allow wet gas or dry gas to pass therethrough while buffering the impact applied to the hollow fiber membranes 211 due to collision. Consequently, the buffer member 217 may be implemented such that wet gas or dry gas can smoothly flow through the first gas outlet 216 and the first gas inlet 215 while buffer the impact applied to the hollow fiber membranes 211. For example, the buffer member 217 may be manufactured using a non-woven material. The buffer member 217 may also be manufactured using a mesh type material.

The buffer member 217 may be coupled to the inner surface of the inner case 212. The buffer member 217 may be coupled to the inner surface of the inner case 212 by fusion, etc.

Referring to FIGS. 2 to 6, 10, and 11, the buffer member 217 may include a first buffer member 2171.

The first buffer member 2171 may be coupled to the inner case 212 so as to block the entire surface of the first gas outlet 216 between the first gas outlet 216 and the hollow fiber membranes 211. Even though the hollow fiber membranes 211 vibrate while wet gas or dry gas is discharged through the first gas outlet 216, therefore, the hollow fiber membranes 211 may not directly collide with the inner case 212 but may collide with the first buffer member 2171. Consequently, the first buffer member 2171 may cushion the impact applied to the hollow fiber membranes 211, whereby it is possible to reduce the risk of damage to or breakage of the hollow fiber membranes 211.

A plurality of first breathing holes 2171a may be formed in the first buffer member 2171. The first breathing holes 2171a may be formed through the first buffer member 2171. Even though the first buffer member 2171 blocks the entire surface of the first gas outlet 216, therefore, wet gas or dry gas may be smoothly discharged through the first breathing holes 2171a. Each of the first breathing holes 2171a may be formed in a smaller size than each of the outflow windows 216a. The first breathing holes 2171a may be formed by forming a plurality of holes in the first buffer member 2171. When the first buffer member 2171 is manufactured using a non-woven material or a mesh type material, the first breathing holes 2171a may be implemented by holes in the material.

Referring to FIGS. 2 to 6 and 10 to 12, the buffer member 217 may include a second buffer member 2172.

The second buffer member 2172 may be coupled to the inner case 212 so as to block the entire surface of the first gas inlet 215 between the first gas inlet 215 and the hollow fiber membranes 211. Even though the hollow fiber membranes 211 vibrate while wet gas or dry gas is introduced through the first gas inlet 215, therefore, the hollow fiber membranes 211 may not directly collide with the inner case 212 but may collide with the second buffer member 2172. Consequently, the second buffer member 2172 may cushion the impact applied to the hollow fiber membranes 211, whereby it is possible to reduce the risk of damage to or breakage of the hollow fiber membranes 211.

A plurality of second breathing holes 2172a may be formed in the second buffer member 2172. The second breathing holes 2172a may be formed through the second buffer member 2172. Even though the second buffer member 2172 blocks the entire surface of the first gas inlet 215, therefore, wet gas or dry gas may be smoothly introduced through the second breathing holes 2172a. Each of the second breathing holes 2172a may be formed in a smaller size than each of the inflow windows 215a. The second breathing holes 2172a may be formed by forming a plurality of holes in the second buffer member 2172. When the second buffer member 2172 is manufactured using a non-woven material or a mesh type material, the second breathing holes 2172a may be implemented by holes in the material.

Although the buffer member 217 is shown as including both the first buffer member 2171 and the second buffer member 2172 in FIG. 10, the present disclosure is not limited thereto, and the buffer member 217 may include only one of the first buffer member 2171 and the second buffer member 2172. That is, the buffer member 217 may include at least one of the first buffer member 2171 and the second buffer member 2172.

Figure 13:
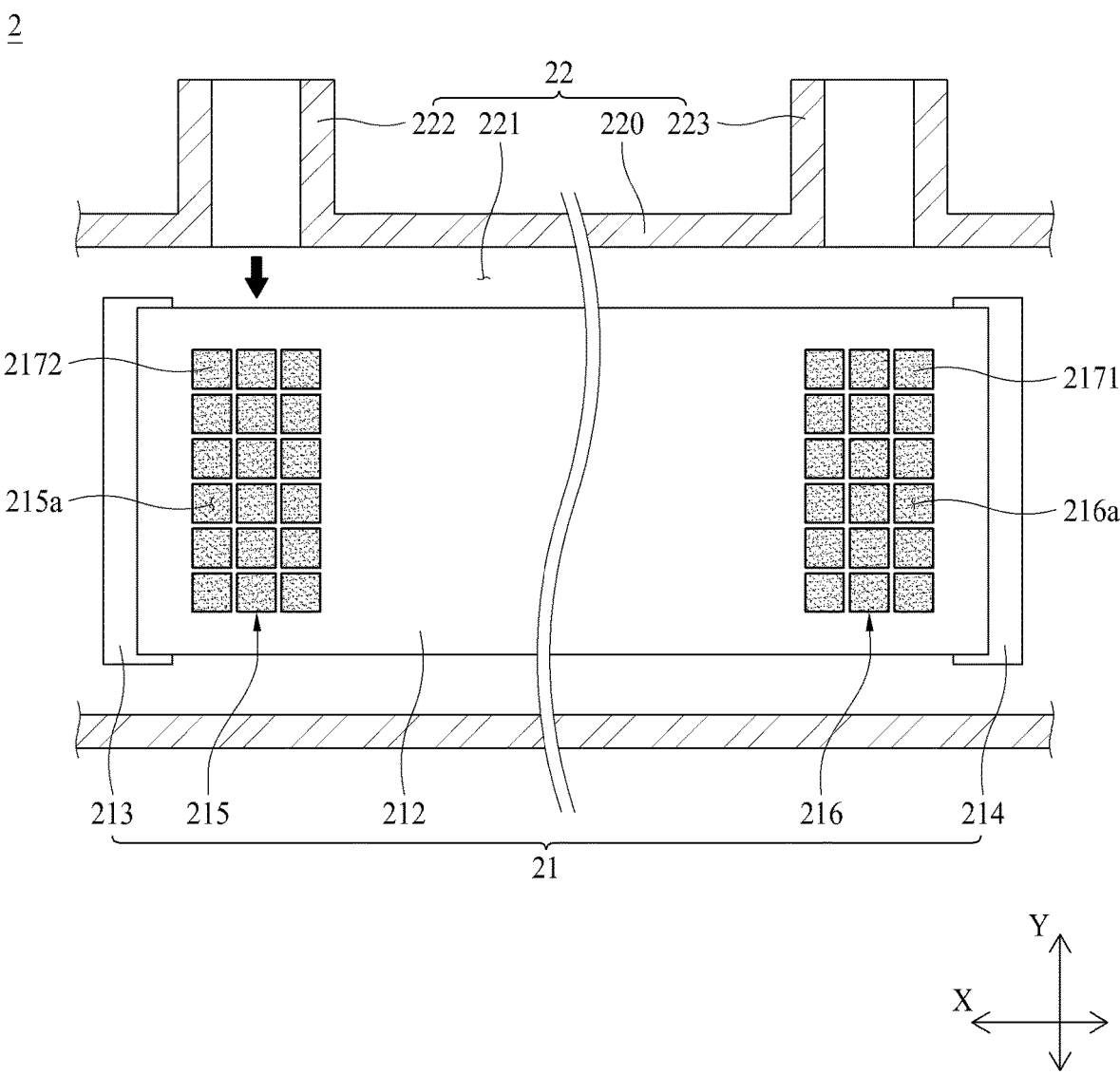
FIGS. 13 and 14 are schematic partial cutaway views showing the state in which the cartridge is located in a mid-case.
Figure 14:
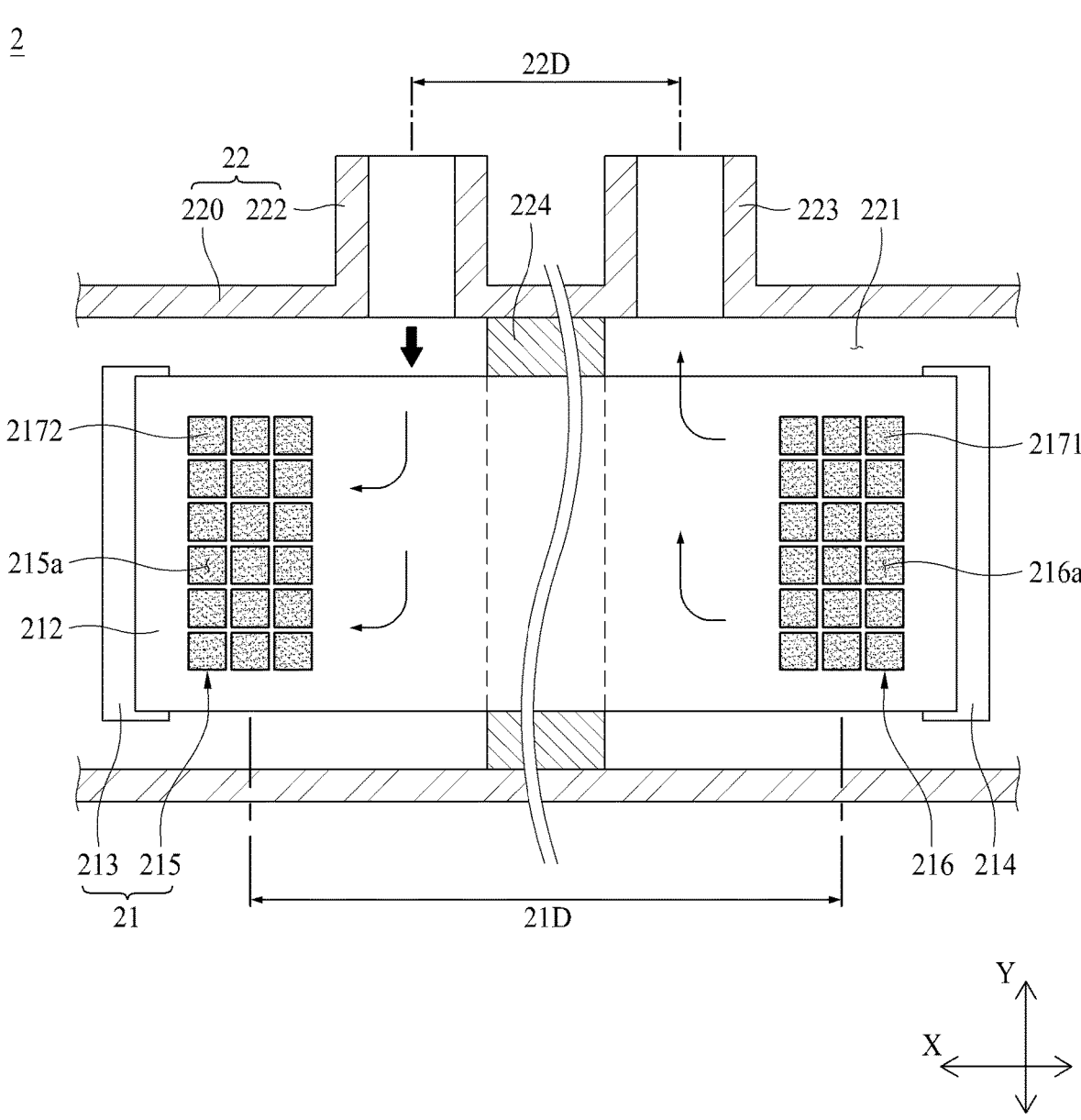

Referring to FIGS. 3, 13, and 14, in the humidifier 1 for fuel cells according to the present disclosure, the distance 21D between the first gas inlet 215 and the first gas outlet 216 (hereinafter referred to as a "first distance 21D") may be implemented so as to be greater than the distance 22D between the second gas inlet 222 and the second gas outlet 223 (hereinafter referred to as a "second distance 22D"). Both the first distance 21D and the second distance 22D are based on the first axis direction (X-axis direction). The first distance 21D may be the distance between a midpoint of the first gas inlet 215 and a midpoint of the first gas outlet 216 in the first axis direction (X-axis direction). The second distance 22D may be the distance between a midpoint of the second gas inlet 222 and a midpoint of the second gas outlet 223 in the first axis direction (X-axis direction).

The first distance 21D may be implemented so as to be a greater than the second distance 22D in the first axis direction (X-axis direction). As a result, the second gas inlet 222 and the first gas inlet 215 may be implemented so as not to partially or entirely overlap each other in the first axis direction (X-axis direction). Consequently, the humidifier 1 for fuel cells according to the present disclosure may be implemented such that the flow of wet gas or dry gas introduced into the mid-case 22 through the second gas inlet 222 is not directly applied to the hollow fiber membranes 211, which will hereinafter be described in detail.

First, in a comparative example implemented such that the first distance 21D (shown in FIG. 14) and the second distance 22D (shown in FIG. 14) are roughly equal to each other in the first axis direction, as shown in FIG. 13, the second gas inlet 222 and the first gas inlet 215 overlap each other. In the comparative example, therefore, wet gas or dry gas introduced through the second gas inlet 222 flows toward the first gas inlet 215 and is directly introduced into the inner case 212 through the first gas inlet 215. In the comparative example, therefore, the flow of wet gas or dry gas is directly applied to the hollow fiber membranes 211 (shown in FIG. 3), whereby there is a high risk of damage to or breakage of the hollow fiber membranes 211 (shown in FIG. 3).

Next, in an example implemented such that the first distance 21D is greater than the second distance 22D in the first axis direction, as shown in FIG. 14, the second gas inlet 222 and the first gas inlet 215 do not overlap each other. In this case, the second gas inlet 222 and the first gas inlet 215 may be disposed so as to be misaligned with each other in the first axis direction (X-axis direction). In the example, therefore, wet gas or dry gas introduced through the second gas inlet 222 flows to a position spaced apart from the first gas inlet 215 and is then introduced into the inner case 212 through the first gas inlet 215. Consequently, the example may be implemented such that the flow of wet gas or dry gas is not directly applied to the hollow fiber membranes 211 (shown in FIG. 3). In the example, therefore, it is possible to reduce the flow of wet gas or dry gas applied to the hollow fiber membranes 211 when compared to the comparative example, whereby it is possible to reduce the degree to which the hollow fiber membranes 211 vibrate due to the flow of the wet gas or the dry gas, and therefore it is possible to further reduce the risk of damage to or breakage of the hollow fiber membranes 211 (shown in FIG. 3). In the example, therefore, it is possible to further extend the lifespan of the hollow fiber membranes 211 when compared to the comparative example. Although not shown, the second gas inlet 222 and the first gas inlet 215 may only partially overlap each other.

The second gas inlet 222 may be spaced apart from each of the first gas inlet 215 and the first gas outlet 216 in the first axis direction (X-axis direction). Consequently, the entirety of the second gas inlet 222 may be implemented so as not to overlap with each of the first gas inlet 215 and the first gas outlet 216. In this case, the second gas inlet 222 may be disposed between the first gas inlet 215 and the first gas outlet 216 in the first axis direction (X-axis direction).

The second gas outlet 223 may be spaced apart from each of the first gas inlet 215 and the first gas outlet 216 in the first axis direction (X-axis direction). In this case, the second gas inlet 222 and the second gas outlet 223 may be disposed between the first gas inlet 215 and the first gas outlet 216 in the first axis direction (X-axis direction). In the humidifier 1 for fuel cells according to the present disclosure, therefore, the second gas inlet 222 and the first gas inlet 215 are disposed so as not to overlap each other, whereby it is possible to reduce damage to or breakage of the hollow fiber membranes 211.

In this case, if the first distance 21D between the first gas inlet 215 and the first gas outlet 216 in the first axis direction (X-axis direction), becomes excessively large, the area of each of the first gas inlet 215 and the first gas outlet 216 may become small, whereby the flow of wet gas or dry gas may increase, and therefore vibration of the hollow fiber membranes 211 may increase. In consideration thereof, the first distance 21D may be determined to be a length such that the hollow fiber membranes 211 may not be damaged or broken due to vibration.

Referring to FIGS. 3, 13, and 14, the mid-case 22 may include a partition member 224.

The partition member 224 is configured to partition the interior of the mid-case 22. The partition member 224 may be disposed between the second gas inlet 222 and the second gas outlet 223 in the first axis direction (X-axis direction). As a result, the partition member 224 may partition the interior of the mid-case 22 into a space connected to the second gas inlet 222 and a space connected to the second gas outlet 223. Consequently, the partition member 224 may prevent wet gas or dry gas introduced through the second gas inlet 222 from being discharged through the second gas outlet 223, whereby it is possible to increase the flow rate of wet gas or dry gas introduced into the first gas inlet 215.

The partition member 224 may close the space between an outer surface of the inner case 212 and an inner surface of the mid-case 22. As a result, the partition member 224 may prevent wet gas or dry gas introduced through the second gas inlet 222 from flowing toward the second gas outlet 223. The partition member 224 may be disposed to surround the outer surface of the inner case 212. The inner surface of the mid-case 22 may be disposed to surround an outer surface of the partition member 224. The dotted line in FIG. 14 indicates the location of the partition member 224. As shown by the dotted line in FIG. 14, the partition member 224 may be disposed so as to traverse the interior of the mid-case 22 between the outer surface of the inner case 212 and the inner surface of the mid-case 22.

Referring to FIGS. 3, 13, and 14, in the humidifier 1 for fuel cells according to the present disclosure, the second gas outlet 223 and the first gas outlet 216 may be disposed so as to face in different directions. In the humidifier 1 for fuel cells according to the present disclosure, therefore, wet gas or dry gas discharged through the first gas outlet 216 may flow in the direction in which the second gas outlet 223 is located, and may then be discharged through the second gas outlet 223. In the humidifier 1 for fuel cells according to the present disclosure, therefore, it is possible to reduce vibration generated at the hollow fiber membranes 211 due to the flow of wet gas or dry gas discharged through the first gas outlet 216, whereby it is possible to further reduce the risk of damage to or breakage of the hollow fiber membranes 211. For example, when the first gas outlet 216 is formed in the upper surface of the inner case 212, the second gas outlet 223 may be disposed so as to face a side surface of the inner case 212.

The second gas inlet 222 and the first gas inlet 215 may be disposed so as to face in different directions. In the humidifier 1 for fuel cells according to the present disclosure, therefore, wet gas or dry gas introduced through the second gas inlet 222 may flow in the direction in which the first gas inlet 215 is located, and may then be introduced through the first gas inlet 215. In the humidifier 1 for fuel cells according to the present disclosure, therefore, it is possible to further reduce the flow of wet gas or dry gas applied to the hollow fiber membranes 211, whereby it is possible to reduce vibration generated at the hollow fiber membranes 211 due to the flow of the wet gas or the dry gas. In the humidifier 1 for fuel cells according to the present disclosure, therefore, it is possible to further reduce the risk of damage to or breakage of the hollow fiber membranes 211. For example, when the first gas inlet 215 is formed in the upper surface of the inner case 212, the second gas inlet 222 may be disposed to face the side surface of the inner case 212.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:

1. A humidifier for fuel cells, the humidifier comprising:
a humidifying module configured to humidify dry gas supplied from outside using wet gas discharged from a fuel cell stack;
a first cap coupled to one end of the humidifying module; and
a second cap coupled to the other end of the humidifying module, wherein

16 the humidifying module comprises:
a mid-case open at opposite ends thereof; and
at least one cartridge disposed in the mid-case, the cartridge comprising a plurality of hollow fiber membranes,
the cartridge comprises:
an inner case open at opposite ends thereof, the hollow fiber membranes being received in the inner case; and
a first gas inlet and a first gas outlet formed at the inner case so as to be spaced apart from each other in a first axis direction,
the inner case comprises:
a first segment in which the hollow fiber membranes are received;
a second segment spaced apart from the first segment in a second axis direction perpendicular to the first axis direction; and
a third segment located between the first segment and the second segment in the second axis direction, and
an average thickness of the third segment is less than each of an average thickness of the first segment and an average thickness of the second segment,
wherein, when a width of the inner case in the second axis direction is defined as H and a maximum thickness of the inner case is defined as T, the inner case is formed in a form that satisfies 0.2H<T<0.5H.

2. The humidifier according to claim 1, wherein the third segment is formed such that a middle portion equidistantly spaced apart from opposite ends in the second axis direction has a smaller thickness than the opposite ends.

3. The humidifier according to claim 2, wherein the third segment is formed so as to have a gradually increasing thickness from the middle portion to the opposite ends while having a minimum thickness at the middle portion.

4. The humidifier according to claim 1, wherein the first segment is formed such that a thickness is gradually changed from one end connected to the third segment to the other end and such that the thickness is gradually increased from the one end to a point having a maximum thickness and is gradually decreased from the point having the maximum thickness to the other end.

5. The humidifier according to claim 1, wherein the inner case is formed so as to be symmetrical with respect to a middle portion equidistantly spaced apart from opposite ends in the second axis direction.

6. The humidifier according to claim 1, comprising a buffer member coupled to the inner case at at least one of a position between the first gas inlet and the hollow fiber membranes and a position between the first gas outlet and the hollow fiber membranes.

7. The humidifier according to claim 6, wherein
the buffer member comprises a first buffer member coupled to the inner case so as to block an entire surface of the first gas outlet between the first gas outlet and the hollow fiber membranes, and
the first buffer member is provided with a plurality of first breathing holes configured to allow wet gas or dry gas to pass therethrough.

8. The humidifier according to claim 6, wherein
the buffer member comprises a second buffer member coupled to the inner case so as to block an entire surface of the first gas inlet between the first gas inlet and the hollow fiber membranes, and
the second buffer member is provided with a plurality of second breathing holes configured to allow wet gas or dry gas to pass therethrough.

9. The humidifier according to claim 6, wherein the buffer member is manufactured using a non-woven material.

10. A cartridge of a humidifier for fuel cells configured to humidify dry gas supplied from outside using wet gas discharged from a fuel cell stack, the cartridge comprising:

an inner case having openings formed in ends thereof, a plurality of hollow fiber membranes being received in the inner case; and a first gas inlet and a first gas outlet formed at the inner case so as to be spaced apart from each other in a first axis direction, wherein the inner case comprises:

a first segment in which the hollow fiber membranes are received;

a second segment spaced apart from the first segment in a second axis direction perpendicular to the first axis direction; and a third segment located between the first segment and the second segment in the second axis direction, and an average thickness of the third segment is less than each of an average thickness of the first segment and an average thickness of the second segment, wherein, when a width of the inner case in the second axis direction is defined as H and a maximum thickness of the inner case is defined as T, the inner case is formed in a form that satisfies 0.2H<T<0.5H.

11. The cartridge according to claim 10, wherein the third segment is formed such that a middle portion equidistantly spaced apart from opposite ends in the second axis direction has a smaller thickness than the opposite ends.

12. The cartridge according to claim 11, wherein the third segment is formed so as to have a gradually increasing thickness from the middle portion to the opposite ends while having a minimum thickness at the middle portion.

13. The cartridge according to claim 10, wherein the first segment is formed such that a thickness is gradually changed from one end connected to the third segment to the other end and such that the thickness is gradually increased from the one end to a point having a maximum thickness and is gradually decreased from the point having the maximum thickness to the other end.

14. The cartridge according to claim 10, wherein the inner case is formed so as to be symmetrical with respect to a middle portion equidistantly spaced apart from opposite ends in the second axis direction.

15. The cartridge according to claim 10, comprising a buffer member coupled to the inner case at least one of a position between the first gas inlet and the hollow fiber membranes and a position between the first gas outlet and the hollow fiber membranes.

16. The cartridge according to claim 15, wherein the buffer member comprises a first buffer member coupled to the inner case so as to block an entire surface of the first gas outlet between the first gas outlet and the hollow fiber membranes, and the first buffer member is provided with a plurality of first breathing holes configured to allow wet gas or dry gas to pass therethrough.

17. The cartridge according to claim 15, wherein the buffer member comprises a second buffer member coupled to the inner case so as to block an entire surface of the first gas inlet between the first gas inlet and the hollow fiber membranes, and the second buffer member is provided with a plurality of second breathing holes configured to allow wet gas or dry gas to pass therethrough.

18. The cartridge according to claim 15, wherein the buffer member is manufactured using a non-woven material.

\* \* \* \* \*